(12) United States Patent
Marche

(10) Patent No.: US 8,944,369 B2
(45) Date of Patent: Feb. 3, 2015

(54) ENGINE ASSEMBLY FOR AIRCRAFT INCLUDING A MODULAR RIGID STRUCTURE FOR MOUNTING PYLONS

(75) Inventor: Jacques Hervé Marche, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 554 days.

(21) Appl. No.: 13/131,939

(22) PCT Filed: Nov. 30, 2009

(86) PCT No.: PCT/FR2009/052334
§ 371 (c)(1),
(2), (4) Date: Sep. 16, 2011

(87) PCT Pub. No.: WO2010/063927
PCT Pub. Date: Jun. 10, 2010

(65) Prior Publication Data
US 2012/0006936 A1    Jan. 12, 2012

(30) Foreign Application Priority Data
Dec. 1, 2008  (FR) ...................................... 08 58166

(51) Int. Cl.
*B64D 27/00*   (2006.01)
*B64D 27/26*   (2006.01)

(52) U.S. Cl.
CPC ..................................... *B64D 27/26* (2013.01)
USPC ............... 244/54; 244/55; 244/131; 248/554; 248/557

(58) Field of Classification Search
CPC .. B64D 29/06; B64D 29/02; B64D 2027/262; B64D 27/12; B64D 27/18; B64D 2027/264
USPC ........... 244/54, 55, 131; 248/637, 678, 228.1, 248/228.2, 231.31; 60/796, 797
See application file for complete search history.

(56) References Cited

U.S. PATENT DOCUMENTS 3,160,967 A * 12/1964 Nichols ........................... 37/446
4,624,599 A * 11/1986 Piasecki ......................... 403/178
(Continued)

FOREIGN PATENT DOCUMENTS

| EP | 0 311 155 A2 | 4/1989 |
| EP | 0 311 155 A3 | 4/1989 |

(Continued)

OTHER PUBLICATIONS

International Search Report issued Feb. 8, 2010, in Patent Application No. PCT/FR2009/052334 (with English translation of Category of Cited Documents).

(Continued)

*Primary Examiner* — Christopher P Ellis
*Assistant Examiner* — George Andonyan
(74) *Attorney, Agent, or Firm* — Oblon, Spivak, McClelland, Maier & Neustadt, L.L.P.

(57) ABSTRACT

An aircraft engine assembly including a mounting pylon including a rigid structure fitted with a central box, together with a forward extension and a rear extension each including an attached upper organ supported on an upper surface of the central box, and an attached lower organ supported on a lower surface of the front end. The forward and rear extensions support at least a part of the first fasteners interposed between the rigid structure and a turbine engine.

9 Claims, 3 Drawing Sheets

(56) References Cited

U.S. PATENT DOCUMENTS

| | | | | |
|---|---|---|---|---|
| 4,715,565 | A | * | 12/1987 | Wittmann .................. 244/173.1 |
| 4,821,980 | A | | 4/1989 | Clausen et al. |
| 4,854,525 | A | * | 8/1989 | Chee ................................ 244/54 |
| 4,861,643 | A | * | 8/1989 | Scollard ........................ 428/162 |
| 5,050,820 | A | * | 9/1991 | Anderson ...................... 244/131 |
| 5,775,638 | A | * | 7/1998 | Duesler ........................... 244/54 |
| 6,474,596 | B1 | * | 11/2002 | Cousin et al. ................... 244/54 |
| 2008/0121754 | A1 | | 5/2008 | Marche et al. |
| 2009/0302159 | A1 | * | 12/2009 | Pajard ........................... 244/124 |
| 2011/0226894 | A1 | * | 9/2011 | Lafont et al. .................... 244/54 |
| 2011/0296676 | A1 | * | 12/2011 | Bonnet et al. ................... 29/700 |

FOREIGN PATENT DOCUMENTS

| | | | | |
|---|---|---|---|---|
| FR | 2 900 906 A1 | | 11/2007 | |
| FR | WO2008099097 A2 | * | 8/2008 | ............... B64C 3/00 |
| FR | 2933071 A1 | * | 1/2010 | |

OTHER PUBLICATIONS

U.S. Appl. No. 13/131,999, filed May 31, 2011, Marche.

\* cited by examiner

ENGINE ASSEMBLY FOR AIRCRAFT INCLUDING A MODULAR RIGID STRUCTURE FOR MOUNTING PYLONS

The present invention relates in a general sense to an aircraft engine assembly, particularly of the type intended to be mounted laterally on a rear part of the aircraft.

Habitually, an aircraft of a defined model is fitted with turbine engines of a given type from among many possibilities offered by the various engine manufacturers. Thus, aircraft of a given model can be fitted with different turbine engines, which leads to disadvantages in terms of the design of the mounting pylons of these turbine engines. Indeed, each mounting pylon must be suited to the chosen type of turbine engine, requiring several pylons of different designs to be produced for a given aircraft model. This leads to additional production costs, principally due to the impossibility of manufacturing all the pylons of a given aircraft model in very large series, using the same design.

The purpose of the invention is therefore to propose an aircraft engine assembly at least partially providing a solution to the disadvantage mentioned above, relative to the embodiments of the prior art.

To accomplish this, the purpose of the invention is an aircraft engine assembly including a turbine engine and a pylon for mounting the turbine engine, where the said engine assembly is intended to be added on laterally to the aircraft, where the pylon includes a rigid structure together with first fasteners interposed between the said rigid structure and the turbine engine, and where the said rigid structure includes a central box extending in a principal direction of the pylon which is roughly parallel to a lengthways axis of the turbine engine. According to the invention, the said rigid structure also includes a forward extension of the central box, where the said forward extension includes an attached upper organ supported on an upper surface of a front end of the central box, together with an attached lower organ supported on a lower surface of the said front end of the box, where the said rigid structure also includes a rear extension of the central box, where the said rear extension includes an attached upper organ supported on an upper surface of a rear end of the central box, and an attached lower organ supported on a lower surface of the said rear end of the box, and where the said forward and rear extensions at least partially support the said first fasteners.

Consequently, the original design proposed by the invention involves a mounting pylon rigid structure which is modular in character, facilitating its adaptation to turbine engines of different designs. In addition, as an indicative example only, whatever the type of turbine engine chosen, the central box of the rigid structure can always be of the same design, and it is then possible to modify only the forward and rear extensions in terms of shape and/or dimensions, in accordance with the said chosen type of turbine engine, to allow the latter to be mounted on the rigid structure.

This modularity generally leads to reduced production costs, principally due to the possibility of manufacturing at least part, preferably the central box, of all the mounting pylons of a given model of aircraft in a very large series, with the same design.

The said forward extension preferably extends forwards beyond the said central box, and/or the said rear extension extends towards the rear beyond the said central box. Nevertheless, one alternative can consist in a design such that one and/or other of these extensions does not extend beyond their associated central box and, without going beyond the scope of the invention. In such a case, the central box is not extended in the principal direction of the pylon, which is comparable to its lengthways direction, but in the direction of its thickness orthogonal to the latter direction.

The upper organ and the lower organ of the said forward extension are preferably connected to one another in the area of their front ends, so as to form, roughly, a V shape opening towards the rear and housing the said front end of the central box between the branches of the V, and/or the upper organ and the lower organ of the said rear extension are connected to one another in the area of their rear ends, so as to form, roughly, a V shape opening towards the front and housing the said rear end of the central box between the branches of the V. It should be noted that the fact of housing the supported ends of the central box within Vs allows a satisfactory transfer of the forces between the extensions and the central box, notably the thrust forces exerted in the lengthways direction.

The said upper and lower organs preferably each have the shape of a box.

It is preferable that the said forward extension supports an engine attachment forward of the said first fasteners, and that the said rear extension supports an engine attachment rear of the said first fasteners.

It is preferable that multiple braces are used to attach the said forward extension to the front end of the central box, where the said braces successively traverse the upper organ, the front end of the central box and the lower organ, and that multiple braces are also used to attach the said rear extension to the rear end of the central box, where the said braces successively traverse the upper organ, the rear end of the central box and the lower organ.

It is preferable that the said rigid structure has an imaginary plane parallel to the lengthways direction of the turbine engine, and roughly forming a plane of symmetry for the said structure, where the rear ends of the upper and lower organs of the forward extension are positioned either side of this plane of symmetry, and the front ends of the upper and lower organs of the rear extension are positioned either side of this plane of symmetry.

The pylon preferably also includes second fasteners intended to be interposed between the said rigid structure and the structure of the aircraft.

Another purpose of the invention is an aircraft including at least one engine assembly as described above.

Other advantages and characteristics of the invention will appear in the non-restrictive detailed disclosure below.

This description will be made with reference to the attached illustrations, among which FIG. 1 represents a schematic top view of a rear part of an aircraft, including an engine mounting pylon according to a preferred embodiment of the present invention;

Figure 1:
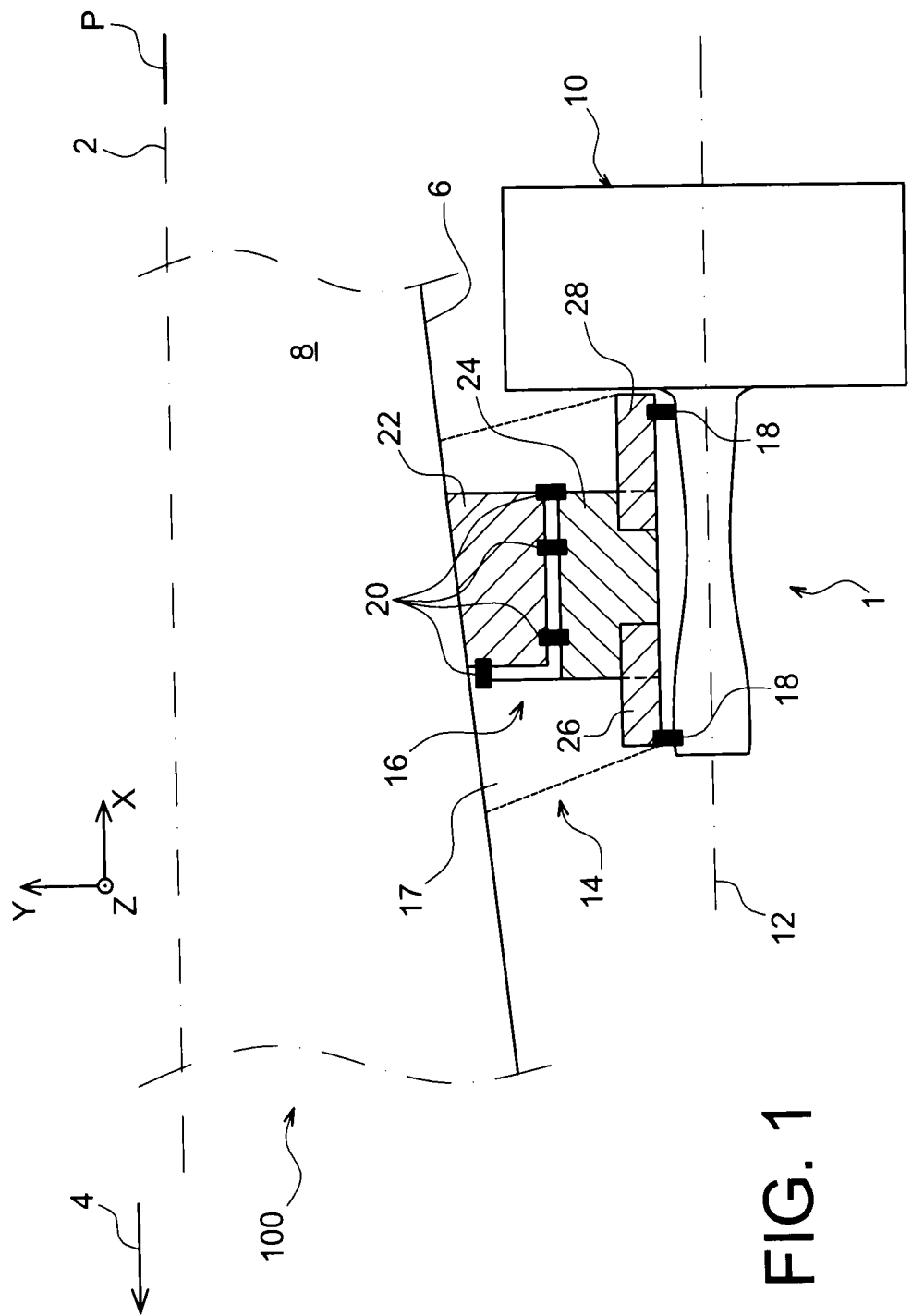

With reference to FIG. 1, a rear part 100 of an aircraft can be seen including an engine assembly having the form of a preferred embodiment of the present invention.

In the whole of the following description, by convention, the lengthways direction of the aircraft which is parallel to a lengthways axis of this aircraft is called X. In addition, the direction aligned transversely relative to the aircraft is called Y, and the vertical direction or direction of the height is called Z, and these three directions X, Y and Z are mutually orthogonal.

In addition, the terms "front" and "rear" must be considered relative to the forward direction of the aircraft imparted due to the thrust exerted by the engines, and this direction is represented schematically by the arrow 4.

Overall, the rear part 100 includes a fuselage 6, of which only a portion of the left-hand part has been represented. The transverse section of this fuselage is roughly circular, elliptical or similar, having a centre passing through the lengthways axis 2, and demarcating an internal space of the aircraft 8.

In addition, it includes two engine assemblies 1 (only one is represented) positioned either side of a vertical median plane P passing through the axis 2. In the preferred embodiment each assembly 1 includes a turbine engine 10, which may equally be of the turbojet or turboprop engine type, or of another type. Each has a lengthways axis 12 which is roughly parallel to direction X. In addition, engine assembly 1 is positioned laterally relative to the fuselage 6, with the stipulation with this regard that there may be an angle between the median horizontal plane of the aircraft and the plane passing through the lengthways axes 2, 12 of the turbine engine and of the aircraft. Typically, this angle may be between 10 and 35°. Be that as it may, engine assembly 1 is considered as being added on laterally to the aircraft, and more specifically to a rear part of it, on the fuselage 6 or a lateral extension of it, behind the principal wing surface.

To provide the suspension of the turbine engine 10 there is a mounting pylon 14, including a rigid structure 16 also called the primary structure, through which the loads are transmitted, where the rigid structure 16 is traditionally encased with aerodynamic fairings 17, also called secondary structures, as represented schematically by dotted lines in FIG. 1.

The pylon 14 has first fasteners interposed between the turbine engine 10 and the rigid structure 16, where these first fasteners represented schematically are referenced 18 in FIG. 1. In addition, the pylon 14 has second fasteners interposed between the turbine engine 10 and the structure of the aircraft, where these second fasteners represented schematically are referenced 20 in FIG. 1. In the represented preferred embodiment, the second fasteners 20 are connected to a lateral fuselage extension 22 but could, of course, be connected alternatively or simultaneously to the fuselage itself.

As will be described in detail in reference to the following figures, the rigid structure 16, which therefore has a structural role, has a modular design in the sense that it includes a central box 24, a forward extension 26 of the central box, and a rear extension 28 of this box.

Figure 2:
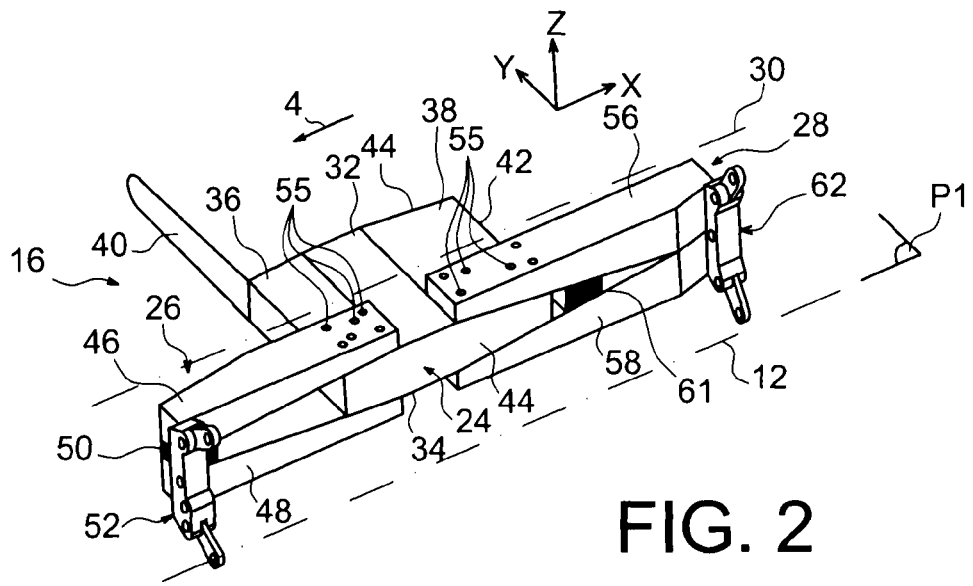
FIG. 2 represents a more detailed perspective view of the rigid structure of the mounting pylon fitted to the assembly shown in FIG. 1.
Figure 3:
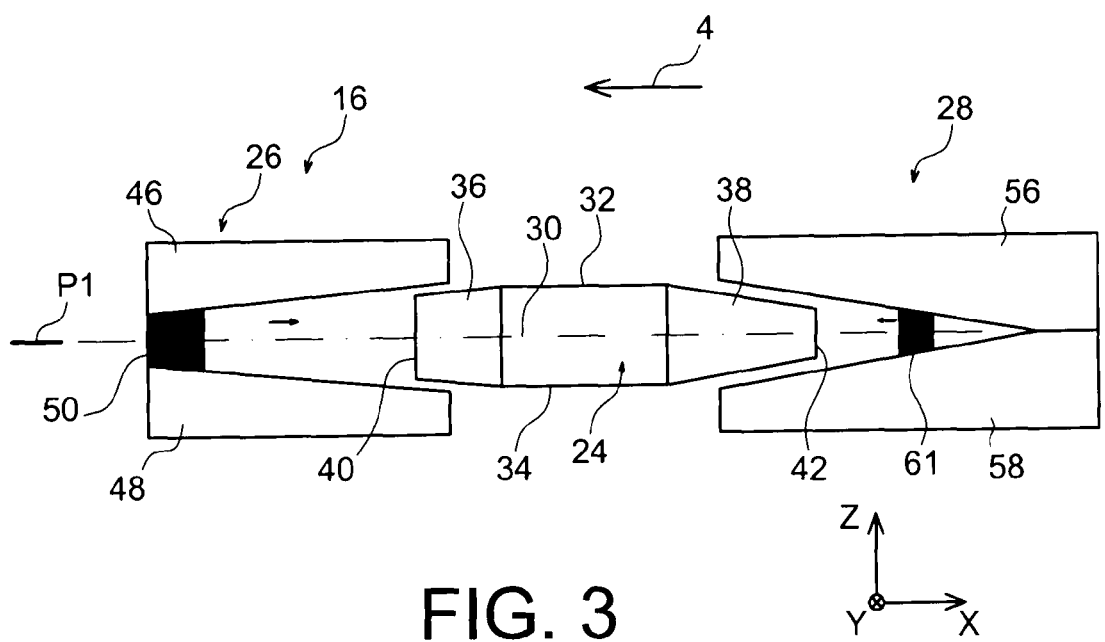
FIG. 3 represents a partially exploded view of the rigid structure shown in FIG. 2, as a cross-section on a plane orthogonal to the plane of symmetry of the rigid structure, parallel to the lengthways axis of the associated turbine engine.

In FIGS. 2 and 3 the rigid structure 16 can be seen, the central box 24 of which extends in a principal direction 30 from the pylon, comparable to its lengthways direction and parallel to direction X. Box 24, which extends between a front end 36 and a rear end 38, has an upper skin forming an upper surface 32, and a lower skin forming a lower surface 34. This box may have a forward closure rib 40 and a rear closure rib 42, and possibly also lateral closure ribs 44 and internal reinforcing ribs (not represented). As can be seen in FIG. 2, in this preferred embodiment the forward closure rib 40 extends radially beyond the box in the direction of the fuselage, such that it approaches the latter.

The box 24, and more generally the entire rigid structure 16, has an imaginary plane P1 forming roughly a plane of symmetry, where this plane is parallel to the direction X, and preferably passes through the lengthways axis of the turbine engine.

In a cross-section in a plane orthogonal to this plane of symmetry, such as that in FIG. 3, it is possible to see that the front end 36 of the box takes the overall shape of a trapezium inclined at 90°, the small base of which is positioned in the most forward position. In a similar fashion, the rear end 38 of the box takes the overall shape of a trapezium inclined at 90°, the small base of which is positioned in the rearmost position. The central part of the box is positioned between the two large bases of the trapezia, and is roughly rectangular in shape.

The front and rear ends 36, 38 are intended to receive the forward and rear extensions 26, 28, respectively, and the combination of these three entities forms a modular design for the rigid structure 16, making it easy to adapt to the different types of turbine engines likely to be mounted in this type of pylon.

The forward extension 26 includes an attached upper organ 46 supported on the upper surface of the front end of the box 24, and an attached lower organ 48 supported on the lower surface 34 of this end 36. Both organs 46, 48, each of which preferably has the shape of a box, have their rear ends supported on, and in contact with, the central box, and extend forwards in the direction of their front end beyond the closure rib 40. Consequently, they form a lengthways extension for the box, and also an extension in the direction of the thickness, orthogonal to the direction 30 and parallel to the cross-section plane of FIG. 3.

The upper organ and the lower organ are preferably connected to one another in the area of their front ends, so as to form, roughly, a V shape opening towards the rear, where this V is therefore inclined at 90° and positioned in the cross-section plane of FIG. 3 such that it houses the front end 36 of the central box between the branches of the V. Thus, the inner surfaces of the branches of the V are in contact, preferably in surface contact, and where both sides of the trapezium form the front end 36, as can be seen in FIG. 2.

For this forward extension 26, which also has plane P1 as its plane of symmetry, the front ends of both organs 46, 48 are not directly in contact, but are separated one from another by a connecting element 50 positioned between these two front ends, and forming the end of the V. Naturally, there could be direct contact between the two organs 46, 48, without going beyond the scope of the invention.

Forward extension 26 supports, in the area of the front ends of the organs, a front engine attachment 52 forming part of the abovementioned first fasteners. This engine attachment is of a design known to the skilled man in the art, namely of the type including brackets and shackles.

Figure 4:
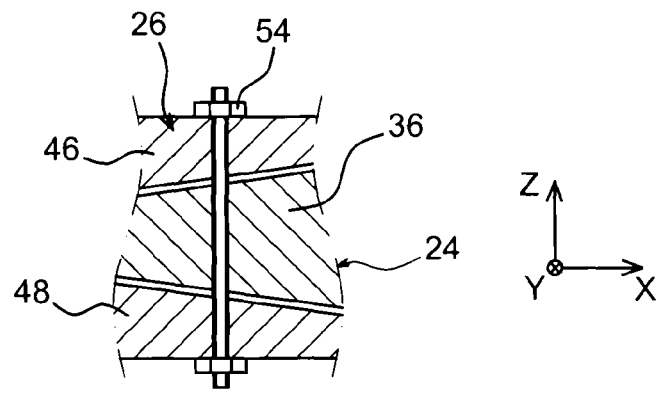
FIG. 4 represents a schematic view of the assembly between the forward extension and the central box of the rigid structure shown in FIGS. 2 and 3.

With reference to FIG. 4, multiple braces 54 fasten the forward extension 26 on to the front end 36 of the central box. These braces 54 (a single one is represented in FIG. 4) are preferably aligned in the direction of the thickness, therefore orthogonally to the lengthways direction 30, and successively traverse the upper organ 46, the front end 36 and the lower organ 48. These braces, which are positioned in the area of the openings of the upper organ 55 shown in FIG. 2, therefore enable a clamping force to be applied by compression, causing each of the two organs 46, 48 to be pinned against the surface of the box 32, 34 opposite it.

In a similar manner, the rear extension 28 includes an attached upper organ 56 supported on the upper surface 32 of the rear end of the box 24, and an attached lower organ 58 supported on the lower surface 34 of this end 38. Both organs 56, 58, each of which preferably has the shape of a box, have their front ends supported on, and in contact with, the central box, and extend towards the rear in the direction of their rear end beyond the closure rib 42. Consequently, they form a lengthways extension for the box, and also an extension in the direction of the thickness, orthogonal to the direction 30 and parallel to the cross-section plane of FIG. 3.

In this case, the upper organ and the lower organ are preferably connected to one another in the area of their front ends, so as to form, roughly, a V shape opening towards the rear, where this V is therefore inclined at 90° and positioned in the cross-section plane of FIG. 3 such that it houses the front end 38 of the central box between the branches of the V. Thus, the inner surfaces of the branches of the V are in contact, preferably in surface contact, and where both sides of the trapezium form the rear end 38, as can be seen in FIG. 2.

For this rear extension 28, which also has plane P1 as its plane of symmetry, both organs 56, 58 have their rear ends directly in contact with one another. Furthermore, it is possible to interpose an additional connecting piece 61 between the two branches, so as to support them at some distance from the point of the V formed at the rear ends of the organs 56, 58

The rear end extension 28 supports, in the area of the rear ends of the organs, an engine attachment 62 forming part of the abovementioned first fasteners. This engine attachment is of a design known to the skilled man in the art, namely of the type including brackets and shackles. The first fasteners preferably consist exclusively of the first and second engine attachment, although a device for transmitting the thrust forces using side rods could be added, without going beyond the scope of the invention.

Although this has not been represented, multiple braces are also used to attach the rear extension 28 on to the rear end 38 of the central box, in a manner identical or similar to that represented in FIG. 4 for the forward extension 26.

As can be seen in the figures, the outer side closure ribs of the organs 46, 48, 56, 58 are preferably flush with the outer side closure rib 44 of the box 24. Conversely, these organs do not extend along the entire side length of the box 24, but only along a portion of it.

The three modules 24, 26, 28 of the rigid structure 16 are preferably made from a metallic material, preferably titanium.

Figure 5:
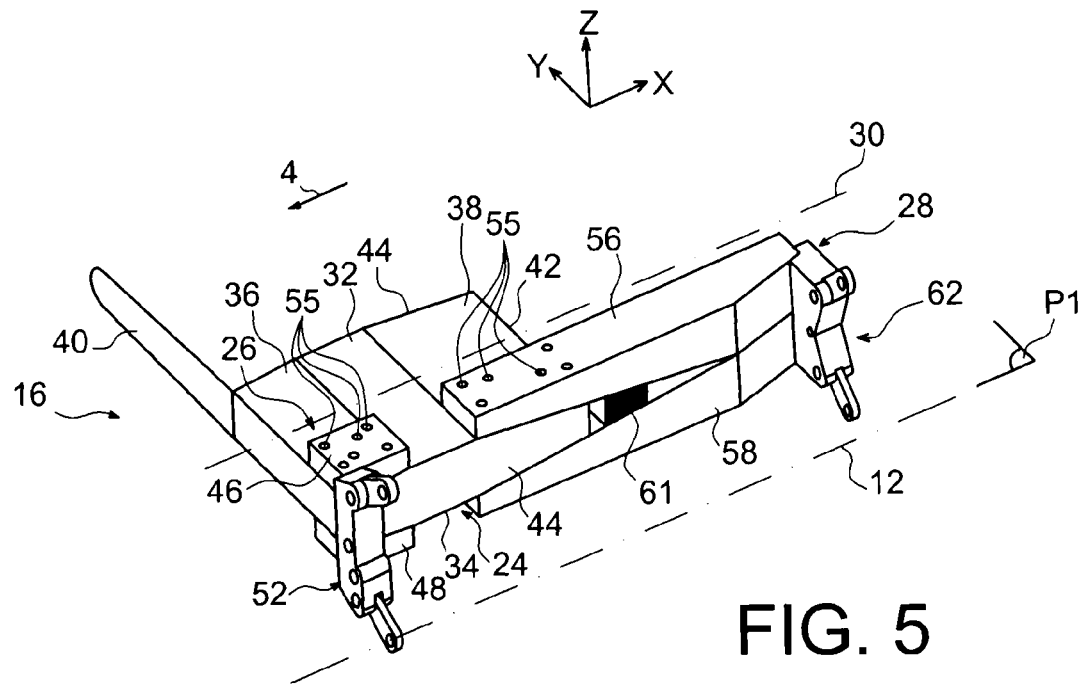
FIG. 5 represents a view similar to the one shown in FIG. 2, in which the rigid structure takes the form of an alternative embodiment.

FIG. 5 shows an alternative embodiment in which only the design of the forward extension 26 differs relative to the one described above. Indeed, its two organs 46, 48 no longer extend protruding towards the front of the central box 24, but are flush with the closure rib 40. Consequently, both front ends of the organs 46, 48 remain separated from one another by the front end 36 of the box which is interposed between them.

This type of rigid structure is preferably chosen over the previous one when both engine attachments 52, 62 must be relatively close to one another in order to match the junction points of the associated turbine engine. Naturally, the design described for the forward extension 26 can also apply to the rear extension 28.

Naturally, various modifications can be made by the skilled man in the art to the invention which has just been described, solely as non-restrictive examples.

The invention claimed is:

1. An aircraft engine assembly configured to be added on laterally to an aircraft comprising:
   a turbine engine, and
   a pylon including
      a rigid structure, and
      first fasteners interposed between the rigid structure and the turbine engine, the rigid structure including
         a central box extending in a principal direction of the pylon which is substantially parallel to a lengthways axis of the turbine engine,
         a forward extension of the central box, with a length of the forward extension substantially parallel to the principal direction of the pylon, the forward extension including
            an attached upper coupling member supported on an upper surface of a front end of the central box, and
            an attached lower coupling member supported on a lower surface of the front end of the box,
         a rear extension of the central box, with a principal direction of the rear extension substantially parallel to the principal direction of the pylon, the rear extension including
            an attached upper coupling member supported on an upper surface of a rear end of the central box, and
            an attached lower coupling member supported on a lower surface of the rear end of the central box,
      wherein the forward and rear extensions at least partially support the first fasteners.

2. An engine assembly according to claim 1, wherein at least the forward extension extends forwards beyond the central box, or at least the rear extension extends towards rearwards beyond the central box.

3. An engine assembly according to claim 1,
   wherein at least the upper coupling member and the lower coupling member of the forward extension are connected to one another in an area of their front ends, so as to form, substantially, a V-shape opening towards the rear and housing the front end of the central box between branches of the "V", or
   the upper coupling member and the lower coupling member of the rear extension are connected to one another in an area of their rear ends, so as to form, substantially, a V-shape opening towards the front and housing the rear end of the central box between branches of the "V".

4. An engine assembly according to claim 1, wherein each coupling member has a shape of a box.

5. An engine assembly according to claim 1, wherein the forward extension supports an engine attachment forward of the first fasteners, and the rear extension supports an engine attachment to the rear of the first fasteners.

6. An engine assembly according to claim 1, wherein multiple braces are used to attach the forward extension to the front end of the central box, wherein the braces successively traverse the upper coupling member, the front end of the central box and the lower coupling member, and the multiple braces are also used to attach the rear extension to the rear end of the central box, wherein the braces successively traverse the upper coupling member, the rear end of the central box, and the lower coupling member.

7. An engine assembly according to claim 1, wherein the rigid structure has an imaginary plane parallel to a lengthways direction of the turbine engine, and substantially forming a plane of symmetry for the structure, wherein the rear ends of the upper and lower coupling members of the forward extension are positioned either side of the plane of symmetry, and the front ends of the upper and lower coupling members of the rear extension are positioned either side of the plane of symmetry.

8. An engine assembly according to claim 1, wherein the pylon further includes second fasteners configured to be interposed between the rigid structure and the structure of the aircraft.

9. An aircraft comprising at least one engine assembly according to claim 1.

* * * * *